Jan. 3, 1956     L. J. VALINCE     2,729,236
REGULATOR AND DIAPHRAGM
Filed Aug. 31, 1951
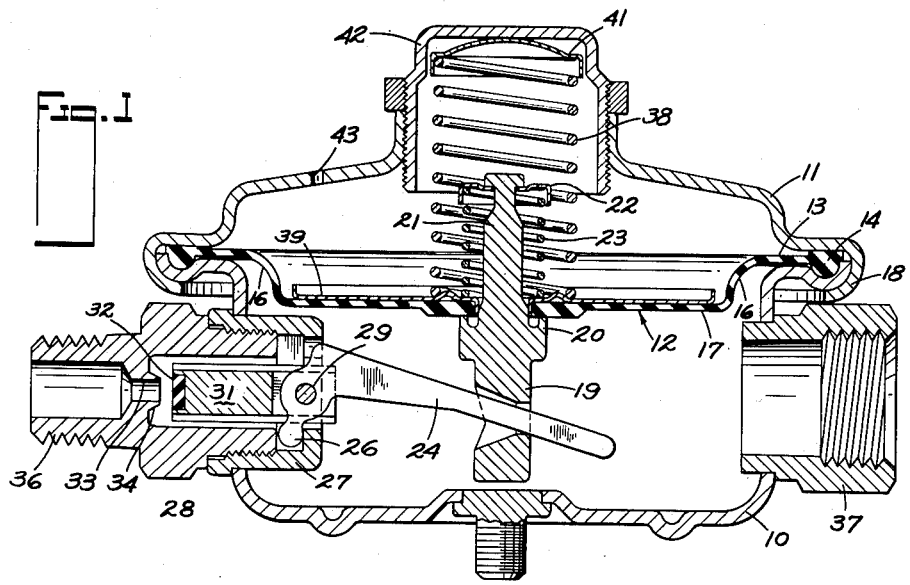
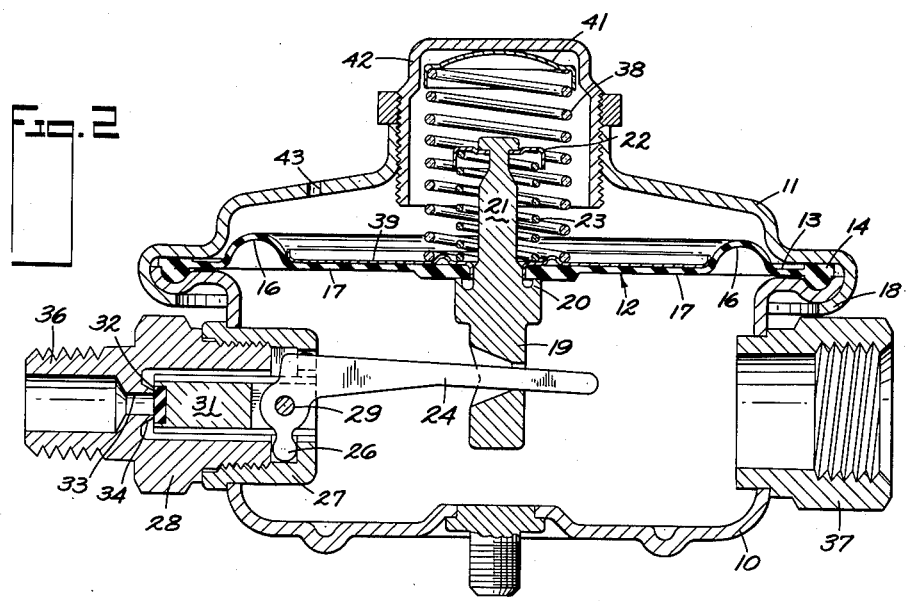
INVENTOR.
LOUIS J. VALINCE
BY
*Pinkey & Watts*
ATTORNEYS United States Patent Office 2,729,236
Patented Jan. 3, 1956

2,729,236

REGULATOR AND DIAPHRAGM

Louis J. Valince, Euclid, Ohio, assignor to The Weatherhead Company, Cleveland, Ohio, a corporation of Ohio Application August 31, 1951, Serial No. 244,631

4 Claims. (Cl. 137—505.46)

This invention relates to fluid pressure regulators of the type wherein a pressure sensitive diaphragm operates a control valve. Such regulators are commonly formed so that pressure within the control chamber moves the diaphragm and associated valve in a direction to close the valve and it is customary to supply a regulating spring acting on the diaphragm in a direction to cause the valve to open and admit more gas when pressure drops within the chamber.

Prior diaphragms employed in regulators of this type incorporate annular humps, corrugations or the like near their edges to facilitate the flexing motion of the diaphragm. Also, where pressure reduction is required, in order to hold down the size of device, it is desirable to incorporate a lever system that reduces the motion of the valve as compared to diaphragm motion. In any event, there is a range of motion of the diaphragm and if the diaphragm is spring-loaded this means that the force exerted by the spring decreases as the diaphragm moves to open the valve and admit more fluid. As a result of this inherent characteristic of the spring, delivery pressure in such regulators drops off as flow increases.

A principal object of the invention is the improvement of the characteristics of the regulator of the type referred to, particularly with regard to the reduction in delivery pressure as flow increases. This is accomplished in a preferred embodiment of the invention by molding a diaphragm of rubber-like material which is in the form of a shallow cup extending into the pressure chamber. This results in the diaphragm resisting the action of pressure in the chamber tending to close the valve. Thus, the diaphragm augments the spring and permits the use of a lighter spring which in turn reduces variations in spring-loading as flow varies. Also, the diaphragm does not act strictly as a spring but tends to impose a more constant load or resistance to valve closing during variations of valve motion in the normal operating range so long as the diaphragm is merely deflected and not stretched. This flattens the flow curve of the regulator and makes the regulator more sensitive as well as increasing the amount of flow that it can handle for a given specified range of delivery pressures.

An additional advantage of this construction is the ease of assembly in that the diaphragm naturally tends to maintain its correct position with the lower casing member during assembly of the upper casing member therewith.

The manner in which these and other objects and advantages may be attained will be apparent in the following detailed description of a preferred embodiment of the invention.

In the drawings:

Fig. 1 is a section through a regulator embodying the invention showing the diaphragm in its molded or unstressed condition; and, Fig. 2 shows the valve closed which is the upper limit of diaphragm motion.

The regulator comprises a lower casing member 10 and an upper casing member 11 with a diaphragm 12 mounted therebetween. The diaphragm and lower casing 10 form the control pressure chamber. The diaphragm is preferably molded of natural or synthetic rubber of the specifications normally used for this purpose in the art. It includes a peripheral flange 13 having an enlarged bead 14 and connected with an annular wall 16 and a flat bottom section 17. Thus, it can be seen that the diaphragm is normally cup-shaped and extends into the control pressure chamber. Parts 10, 11, and 12 are retained together by means of a deformed or spun lip 18 on the upper casing 11. In order to operate the control valve, post 19 is mounted on the diaphragm. It has a relief valve seat 20 engaging the diaphragm and an extension 21 supporting a washer 22 which, by means of spring 23, normally closes the relief valve. This construction does not enter into the invention and may be omitted. The diaphragm pivotally connects to a bellcrank lever 24 having an ear 26 pivoting in a groove formed by a pair of inlet members 27 and 28. The bellcrank lever is pivoted at 29 to the valve plunger 31 mounting a soft valve disc 32. An inlet orifice 33 is formed in the outer inlet member 28 and is surrounded by a valve seat 34 for cooperation with valve disc 32. The inlet member includes a nipple 36 for connection to the supply. An outlet member 37 is provided for delivery.

In the arrangement shown, pressure within the control valve acts upon the diaphragm and tends to close the valve. This action is opposed by a main regulating spring 38 engaging a backing plate 39 on the diaphragm at one end and an anti-friction washer 41 at the other end. Spring tension is adjusted by means of cap 42, threaded in the upper casing section, thereby determining the setting or mean delivery point of the regulator. The usual atmosphere vent 43 is provided in casing part 11.

Although size is not an aspect of the invention, a typical regulator may have a diaphragm with a diameter of approximately 3 inches, an inlet port of .113 inch diameter and a 5 to 1 lever reduction and will control pressures between 10 and 200 p. s. i. at the inlet so as to deliver up to 50 cubic feet per hour of gas at between 8 to 14 inches of water delivery pressure.

The position shown in Fig. 1 is the full open position and is seldom attained in normal operation because of the loss of control by the valve plunger. In normal operation the valve is almost closed (it being completely closed in Fig. 2) as the diaphragm is lifted towards the normal operating range. This action is progressively resisted by its spring 38 and is also resisted by the diaphragm itself due to the nature of the annular wall section 16 (Fig. 1) as opposed to the symmetrical annular humps usually employed. However although the spring force varies directly with its deflection of motion, the resistance of the diaphragm to a given increment of deflection is comparatively constant or at least varies at a lower rate than does the spring. This relatively constant resistance to deflection will be present so long as the diaphragm is only deflected and is not stretched. Of course, the annular wall 16 provides ample range of deflection and prevents any possibility of stretching the diaphragm. The result is that since the diaphragm augments the spring, the spring can be made lighter and hence, for a given decrease of motion, its force variation will be decreased. Since the force variation of the diaphragm for a given increment of motion is small, the total effect as compared to the use of a conventional diaphragm with a spring that exerts the entire opening force, is to reduce the drop of delivery pressure as flow increases. For example, for a range of diaphragm motion of .3 inch in the simple regulator described, with a conventional diaphragm and independent spring the change in spring force is 7 ounces. Substituting a diaphragm made in accordance with the invention, molded of Buna N synthetic rubber and having a wall thickness of .020 inch, a lighter spring may be employed and the force variation over the same range of motion of the diaphragm is 5 ounces, representing almost a 30% reduction in spring rate variation.

In addition to the aforesaid advantages, it can be seen that, due to the cup-shaped form of the diaphragm, it tends to resist dislodgement during assembly in the lower casing facilitating the assembly operation.

It will be recognized that the effective spring rate of the diaphragm may be increased by employing a thicker wall section 16 or by molding the diaphragm from a material harder than that mentioned. Of course, the reverse is also true.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

I claim:

1. A fluid pressure regulator comprising a casing, a resilient diaphragm movable between a first position and a second position in said casing forming a fluid pressure chamber, inlet and outlet means in said casing for said chamber, a valve in said inlet means, valve operating means connected between said diaphragm and valve, a spring urging said diaphragm toward said first position, said diaphragm formed to assume said first position when unstressed and arranged to deflect between said first position and second position without stretching, said operating means positioning said valve in a substantially full open position when said diaphragm is in said first position, the resilience of said diaphragm operating to resist deflection from said first position due to fluid pressure in said chamber and creating an internal force tending to return said diaphragm to said first position.

2. A fluid pressure regulator comprising a casing, a resilient diaphragm movable between a first position and a second position in said casing forming a fluid pressure chamber, inlet and outlet means in said casing for said chamber, a valve in said inlet means, valve operating means connected between said diaphragm and valve, a spring urging said diaphragm toward said first position, said diaphragm formed to assume said first position when unstressed and arranged to deflect between said first position and second position without stretching, said valve operating means and valve arranged so that said valve is open when said diaphragm is in said first position and said valve moves toward its closed position as the diaphragm moves from said first position toward said second position, the resiliency of said diaphragm creating a force which resists motion from said first position and tends to move said diaphragm toward said first position.

3. A fluid pressure regulator comprising a casing, a diaphragm in said casing forming a fluid pressure chamber, inlet and outlet means in said casing for said chamber, a valve in said inlet means, valve operating means connecting between said diaphragm and valve, said diaphragm formed of flexible material with a peripheral mounting flange section, a generally flat main section off-set from said flange into said casing when the diaphragm is in its normal unstressed condition, and an annular wall connecting said two sections, said valve operating means being formed so that said valve assumes substantially the full open position with said diaphragm in said unstressed condition, said diaphragm operating to resist deflection from said unstressed position due to fluid pressure in said chamber, the resiliency of said diaphragm creating a force tending to move said diaphragm back to its unstressed condition when deflected therefrom, said annular wall providing movement of said flat main section without stretching through the normal range of said diaphragm.

4. A fluid pressure regulator comprising a casing, a resilient diaphragm movable between said first position and a second position in said casing forming fluid pressure chamber, inlet and outlet means in said casing for said chamber, a valve in said inlet means, valve operating means connected between said diaphragm and valve, said diaphragm formed to assume the first position when unstressed and arranged to deflect between said first position and said second position without stretching, said valve operating means and valve arranged so that said valve is fully open when said diaphragm is in said first position and moves toward its closed position when said diaphragm moves from its first position toward its second position, the resiliency of said diaphragm creating a force tending to move said diaphragm toward said first position when deflected therefrom.

References Cited in the file of this patent

UNITED STATES PATENTS

| 334,714 | Metzger | Jan. 19, 1886 |
| 957,347 | Kennedy | May 10, 1910 |
| 1,859,089 | Holmes | May 17, 1932 |
| 2,038,013 | Temple | Apr. 21, 1936 |
| 2,517,745 | Weatherhead | Aug. 8, 1950 |
| 2,545,857 | Perkins | Mar. 20, 1951 |
| 2,564,693 | Hornbostle | Aug. 21, 1951 |

OTHER REFERENCES

Report No. 206, National Advisory Committee for Aeronautics, Government Printing Office, 1925 (page 5 only relied on).